US011625175B1

(12) United States Patent
Krasilnikov et al.

(10) Patent No.: US 11,625,175 B1
(45) Date of Patent: Apr. 11, 2023

(54) MIGRATING VIRTUAL RESOURCES BETWEEN NON-UNIFORM MEMORY ACCESS (NUMA) NODES

(71) Applicant: Amazon Technologies, Inc., Seattle, WA (US)

(72) Inventors: Nikolay Krasilnikov, Seattle, WA (US); Oleksii Tsai, Kenmore, WA (US); Alexey Gadalin, Kirkland, WA (US); Guy Parton, Cape Town (ZA); Anton Valter, Renton, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 17/362,303

(22) Filed: Jun. 29, 2021

(51) Int. Cl.
*G06F 3/06* (2006.01)
(52) U.S. Cl.
CPC ............ *G06F 3/0631* (2013.01); *G06F 3/061* (2013.01); *G06F 3/067* (2013.01); *G06F 3/0647* (2013.01)
(58) Field of Classification Search
CPC ........ G06F 3/0631; G06F 3/061; G06F 3/067; G06F 3/0647
USPC .......................................................... 711/154
See application file for complete search history.

(56) References Cited

U.S. PATENT DOCUMENTS

| 2014/0365738 | A1* | 12/2014 | Hod ........................ G06F 12/08 711/160 |
| 2016/0085571 | A1* | 3/2016 | Kim ......................... G06F 9/48 718/1 |
| 2017/0212845 | A1* | 7/2017 | Conway .............. G06F 12/1027 |
| 2022/0206700 | A1* | 6/2022 | Ng ........................ G06F 3/0647 |

* cited by examiner

*Primary Examiner* — Than Nguyen
(74) *Attorney, Agent, or Firm* — Lee & Hayes, P.C.

(57) ABSTRACT

Techniques for a device with NUMA a memory architecture to migrate virtual resources between NUMA nodes to reduce resource contention between virtual resources running on the NUMA nodes. In some examples, the device monitors various metrics and/or operations of the NUMA nodes and/or virtual resources, and detect events that indicate that virtual resources running on a same NUMA node are contending, or are likely to contend, for computing resources of the NUMA node. Upon detecting such an event, the device may migrate a virtual resource from the NUMA node to another NUMA node on the device that has an availability of computing resources. The device may then migrate the virtual resource from the overcommitted NUMA node onto the NUMA node that has availability to run the virtual resource. In this way, devices may reduce resource contention among virtual resources running on a same NUMA node.

20 Claims, 9 Drawing Sheets

US 11,625,175 B1

MIGRATING VIRTUAL RESOURCES BETWEEN NON-UNIFORM MEMORY ACCESS (NUMA) NODES

BACKGROUND

Service providers offer cloud-based services to fulfill users' computing-service needs without the users having to invest in and maintain computing infrastructure required to implement the services. These service providers maintain networks of managed computing resources and functionality to implement various types of scalable, on-demand services, such as storage services, compute services, database services, networking services, and so forth. The networks of computing resources, or "service provider networks," can include computing systems that are located across multiple, distinct regions and interconnected by a communication network, or a series of communication networks, to exchange data. Specifically, data centers or data processing centers, may include a number of interconnected computing devices (or "servers") to provide computing resources to users of the service provider networks.

To increase the utilization of the computing resources, virtualization technologies may allow a single server (or other physical computing device) to host multiple virtual computing resources. For example, a single server can host multiple instances of virtual machines (VM) (also referred to herein as "virtual machine instances" or "VM instances") that appear and operate as independent physical computing devices for users, but each share or are allocated portions of the computing resources of the single, underlying physical computing device. In this way, rather than having a single user or process underutilize the resources of a physical computing device, multiple users or processes can utilize the resources of the physical computing device to increase resource utilization.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

DETAILED DESCRIPTION

Figure 1:
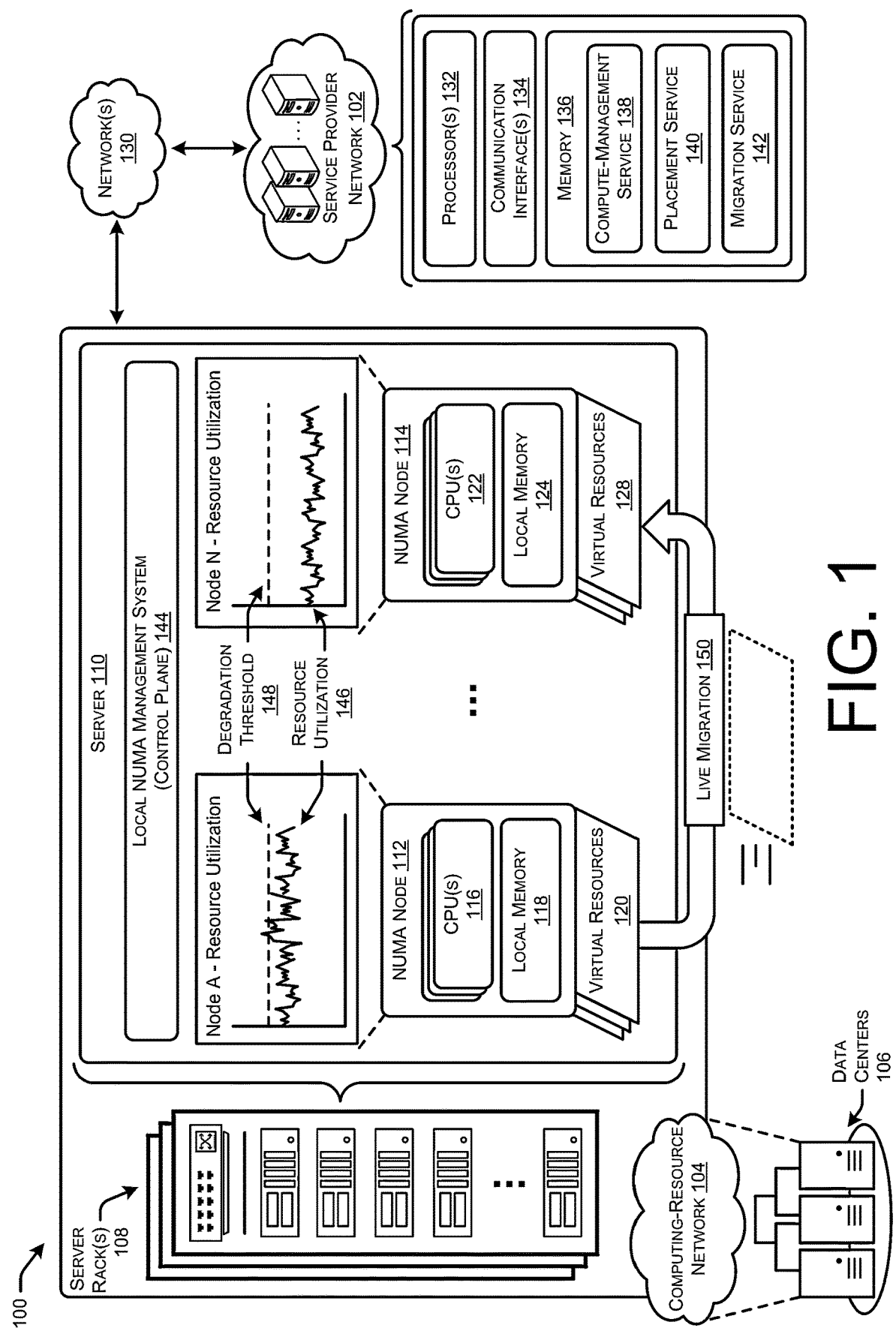
FIG. 1 illustrates a system-architecture diagram of an example environment in which a server reduces resource contention for local computing resources by migrating a virtual resource from running on a Non-Uniform Memory Access (NUMA) node that has high resource consumption to another NUMA node that has lower resource consumption.

Service providers offer various network-based (or "cloud-based") services to users to fulfill computing needs of the users. These service providers may operate service provider networks that include clusters of managed servers (or other hardware-based computing devices) stored in data centers located across different geographic regions. A user of the service provider network can request that the service provider allocate computing resources in these data centers to support computing workloads on behalf of the users. One or more services of the service provider network can receive these requests and allocate physical computing resources to support the workloads, such as usage of computer processors, memory, storage drives, computer network interfaces, and/or other hardware resources of a computing device, for the user. As used herein, computing resources refers to compute (e.g., CPU), memory, storage (e.g., disk), networking (e.g., network I/O, bandwidth, etc.), and, in some implementations, graphics processing (e.g., GPU).

As noted above, the service provider networks may utilize virtualization technologies such that the computing devices can each host multiple VM instances that appear and operate as independent computing devices to support workloads of users. Rather than allocating all of the computing resources of a physical computing device to support a single workload, the computing resources of a physical computing device can be allocated amongst multiple VM instances that support different workloads. The service provider network supports many different types of workloads on behalf of users, and these workloads often have different computing resource needs. As described herein, a workload is implemented by a designated set of computing resources and the workload itself can be considered as code or logic that performs functionality using the computing resources.

In some instances, virtual machines running on the same server may utilize too much of a particular computing resource (e.g., central processing unit (CPU), memory, storage, network bandwidth, etc.), and that can result in performance degradation. As an example, if the memory of the server is overcommitted to the virtual machines, then the server might start storing and receiving data from secondary storage, which results in loss in performance for the virtual machines running on the server. In examples where computing resources of a server are overcommitted, service providers have traditionally performed migrations (e.g., hot migration, cold migration, etc.) where a virtual machine is migrated from a hot, or overcommitted, server onto a server with available computing resources in order to reduce overcommitment. While this is helpful to reduce overcommitment of resources of a server, migrating virtual machines takes time and bandwidth resources when transferring data representing the state of the virtual machine between servers. Accordingly, migrating virtual machines, or other virtual resources, between physical devices to reduce overcommitment has various disadvantages.

Traditionally, servers and other physical computing devices have utilized a symmetric multiprocessing (SMP) architecture where all the CPUs in the server share a single front bus that is used to access memory, manage tasks and threads, etc. However, this front bus can become a bottleneck and point of contention, which makes it difficult to scale. To help address these issues, Non-Uniform Memory Access (NUMA) memory systems or architectures have been used. In NUMA systems, there are multiple NUMA nodes, which are localized structures that each have their own bus. Each NUMA node includes one or more CPUs that are directly connected to local memory. The NUMA architecture provides for fast CPU access to local memory, but access to remote memory (e.g., memory in other NUMA nodes) can be multiple times slower as compared to local memory access. Thus, NUMA architectures improve scalability and performance with respect to traditional shared-memory architectures, In some instances, the service provider network may run virtual resources on servers that have multiple NUMA nodes. Using NUMA nodes may allow for additional scaling for server capacity such that each server can host additional virtual resources, particularly in the case of over-subscribed models (e.g., multiple virtual resources share and compete for the same hardware resources). However, as noted above, the computing resources of a server that has a NUMA architecture cannot be universally shared among NUMA nodes, and each NUMA node needs to be separately managed for resource contention, such as conflicts of access to shared CPU, shared memory, shared storage, and/or shared network resources. Therefore, similar to how a server can become overcommitted, individual NUMA nodes may also become overcommitted, which can result in performance degradation.

This disclosure describes techniques for servers, or other devices, having NUMA memory architectures to migrate virtual resources between NUMA nodes in order to reduce resource contention between virtual resources running on the NUMA nodes. In some examples, the servers may monitor various metrics or operations of the NUMA nodes and/or virtual resources, and detect events that indicate that virtual resources running on a same NUMA node are contending, or are likely to contend in the future, over computing resources of the NUMA node. Upon detecting such an event, the server may determine to migrate a virtual resource from the NUMA node to another NUMA node on the server that has an availability of computing resources to run the virtual resource. In some instances, the server may determine that multiple NUMA nodes are able run the virtual resource, and select the NUMA node that has the greatest availability of computing resources for running the virtual resource. The server may then migrate the virtual resource from the overcommitted NUMA node onto the NUMA node that has availability to run the virtual resource. In this way, the server may reduce resource contention among virtual resources running on a same NUMA node.

Generally, a placement service or system of the service provider network will place virtual resources on servers that have available computing resources for running the virtual resource. In some examples, the NUMA nodes may each have pre-allocated "slots" which are backed by different configurations of computing resources. That is, each NUMA node may have multiple slots where each slot has a pre-allocated portion of, CPU core, local memory, and/or other computing resources. The placement system may place or deploy virtual resources to slots that are pre-allocated appropriate or suitable amounts of computing resources to run the particular virtual resources. The placement service may utilize various heuristics or rules to attempt to place virtual resources on NUMA nodes such that the NUMA nodes and/or server do not become overcommitted.

The servers may include a monitoring component that monitors the NUMA nodes and/or virtual resources to detect events that indicate resource contention or performance degradation. For instance, the monitoring component may detect that two virtual resources ask for CPU at the same time, or substantially the same time, and only one of the virtual resources was given CPU. In such an example, it may be determined that the CPU resource is overcommitted and is causing performance degradation. As another example, the monitoring component may determine that an average, or peak, utilization value for a particular computing resource provided by a NUMA node is over a threshold value that is indicative of performance degradation. For instance, the monitoring component may determine that a utilization rate of the local memory of a NUMA node is above a threshold value (e.g., 90%, 95%, etc.) that generally results in poor performance by the NUMA node in supporting virtual resources. In another example, the NUMA node may be running under-provisioned virtual resources that are ensured access to various amounts of computing resources, and the threshold value may be lower (e.g., 50%, 60%, etc.). In such examples, the monitoring component may determine that the virtual machines are contending with each other for access to computing resources, and that the NUMA node is overcommitted (e.g., cannot provide an amount of computing resources that are supposed to be allocated to the virtual resources).

In such examples, a migration component (e.g., a control-plane component) may migrate a virtual resource from the overcommitted, or poorly performing, NUMA node onto a NUMA node with sufficient computing resources to run the virtual resource. In examples where the server has a higher number of NUMA nodes (e.g., 3 or more), the migration component may rank the NUMA nodes based on the availability of computing resources. For instance, the migration component may obtain utilization data from the NUMA nodes and determine, across the different types of computing resources, which of the NUMA nodes has the most additional computing resources. The migration component may then migrate one or more virtual resources from the overcommitted NUMA node to a NUMA node with available and sufficient computing resources. The virtual resources may be migrated during run time and stay available (e.g., hot migration), or when the virtual resource has been powered off (e.g., cold migration). The migration component may ensure that memory is pre-allocated for the virtual machines, and copy data from the current local memory bank to the local memory bank on which the virtual machines are to run. In this way, one or more components on the server may reduce resource contention on individual NUMA nodes and increase the performance of virtual resources.

Although some of the techniques described herein are with reference to virtual machines or VM instances and virtual machine types, the techniques are applicable to any type of virtual computing resource. For example, the techniques are generally applicable to any type of virtual computing resource that is allocated underlying portions of physical computing resources and executes within a virtual machine, or independently executes on the physical computing resources. Such virtual computing resources can include a container executing on a physical resource, a virtual machine instance running one or more containers, a serverless function running on a VM and/or container, processes, software, and/or any other executable that is allocated portions of physical computing resources.

In light of the different workloads that are supported on behalf of users, the service provider network may provide users with a selection of a variety of virtual resource types optimized to support different workloads. Generally, each virtual resource instance type may be allocated a different amount of computing resources, and/or different combination of computing resources, such that the virtual resource instance types are optimized, or computationally configured, to support different workloads. As used herein, computing resources refers to compute, memory, storage, networking, and, in some implementations, graphics processing. As an example, one virtual resource instance type may be allocated a larger amount of compute (e.g., processor cycles) and be optimized to support compute-heavy workloads, whereas another virtual resource instance type may be allocated a larger amount of storage (e.g., disk space) and be optimized to support storage-intensive workloads. In this way, users can select a virtual resource instance type or platform that is more optimized to support their workload, thereby increasing the performance of the workload while reducing underutilization of computing resources by the service provider network. Further, the slots of the NUMA nodes may be allocated different amounts and/or rations of underlying computing sources to support the different virtual resource types. Accordingly, the slots may be selected to support a virtual resource based on the slot being optimized or sufficient to run that particular virtual resource type. This application describes techniques that decrease the overcommitment of computing resources provided by servers and/or NUMA nodes of the servers.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an example environment 100 in which a server reduces resource contention for local computing resources by migrating a virtual resource from running on a NUMA node that has high resource consumption to another NUMA node that has lower resource consumption.

As illustrated, a service provider network 102 that is operated and/or managed by a service provider may provide various services to users to fulfil their computing resource needs, such as cloud-based computing resources. For example, the service provider network 102 may provide cloud-based, scalable, and network accessible compute power services, storage services, database services, and/or other services. Users may subscribe for use of the computing resources and/or services provided by the service provider network 102. The service provider network 102 may include, manage, own, or otherwise be associated with a computing-resource network 104 that is comprises of a network of data centers 106.

The service provider network 102 and computing-resource network 104 may span across different geographic regions, and include or be associated with includes clusters of managed computing devices 110 (e.g., servers) stored in data centers 106 located across the different geographic regions. In this way, users who have subscribed for use of the network-based services supported by computing resources in the data centers 106 need not invest in and maintain the computing infrastructure required to implement the various services that they may need. In some examples, users of the service provider network 102 may access or utilize computing resources of the servers 110 (and/or any computing device) in the data centers 106 located in different geographic regions such that users located in these different geographic regions are provided with access these resources and services.

Generally, the servers 110 may be located in server racks 108 in the data centers 106 and may provide various types of computing resources, such as compute (CPU) resources (e.g., central processing units (CPUs) for processing data), memory resources (e.g., physical devices capable of storing information such as RAM or ROM), storage resources (e.g., disk storage or drive storage used to store data by various electronic, magnetic, optical, or mechanical changes to a surface layer of one or more rotating disks), graphics compute (GPU) resources (e.g., graphics processing units (GPUs)), and/or network throughput resources (e.g., average or measured rate of bit transmission per second over networks). The servers 110 may be various types of computing devices, such as devices that have different chip set generations, are from different vendors, have different hardware architectures, and so forth.

Thus, the computing resources of the computing-resource network 104 provided by the servers 110 can include, for example, any hardware computing device resources, such as processor computing power/capacity, read-only and/or random-access memory, data storage and retrieval systems, device interfaces such as network or peripheral device connections and ports, and the like. In some embodiments, these resources may be dispersed among multiple discrete hardware computing devices (e.g., servers), and these hardware servers 110 may implement or communicate with a virtualization layer and corresponding virtualization systems (e.g., a hypervisor on a server), whereby the compute resources are represented by, and made accessible as, virtual computing resources, such as instances of virtual machine or "VM instances." A virtual computing resource may be a logical construct, such as a data volume, data structure, file system, and the like, which corresponds to certain compute resources. Non-limiting examples of virtual computing resources include virtual machines, containers, logical data storage volumes capable of storing files and other data, serverless functions, software programs, data processing services, and the like.

The server 110 may have a NUMA architecture that locates various subsets of system memory near subsets of the CPU cores. In a NUMA architecture, the memory access time depends on the memory location relative to the processor. That is, a processor can access its own local memory faster than non-local memory (e.g., memory local to another processor). The NUMA system provides for separate memory allocations for each processor (or group of processors) in a multiprocessor system, which helps avoid the performance degradation when several processors attempt to address the same memory. Each grouping of the processors and their associated connected memory is known as a NUMA node. A set of CPU cores and their associated local memory are referred to as a NUMA "node."

As illustrated, the server 110 may include multiple NUMA nodes 112 and 114. NUMA node 112 includes one or more CPUs 116 and local memory 118, and NUMA node 114 similarly may include one or more CPUs 122 and local memory 124. The NUMA node 112 may be running one or more virtual resources 120 (e.g., VMs, containers, etc.) and the NUMA node 114 may also be running one or more virtual resources 128 (e.g., VMs, containers, etc.)

In some instances, the service provider network 102 may deploy or cause to run virtual resources 120/128 on servers 110 that have multiple NUMA nodes. Using NUMA nodes may allow for additional scaling for server capacity such that each server can host additional virtual resources, particularly in the case of over-subscribed models (e.g., multiple virtual resources share and compete for the same hardware resources). However, the computing resources of a server 110 that has a NUMA architecture cannot be universally shared among NUMA nodes, and each NUMA node needs to be separately managed for resource contention, such as conflicts of access to shared CPU, shared memory, shared storage, and/or shared network resources. Therefore, similar to how a server can become overcommitted, individual NUMA nodes may also become overcommitted, which can result in performance degradation.

Generally, a placement service 140 or system of the service provider network 102 will place virtual resources 120/128 on servers 110 that have available computing resources for running the virtual resources 120/128. The placement service 140 may place virtual resources 120/128 on NUMA nodes 112/114 based on those NUMA nodes have sufficient availability to run the virtual resources 120/128. In some examples, the NUMA nodes 112/114 may each have pre-allocated "slots" which are different configurations of computing resources. That is, each NUMA node 112/114 may have multiple slots where each slot has a pre-allocated portion of, CPU core, local memory, and/or other computing resources. The placement system 140 may place or deploy virtual resources 120/128 to slots that are pre-allocated appropriate or suitable amounts of computing resources to run the particular virtual resources 120/128. The placement service 140 may utilize various heuristics or rules to attempt to place virtual resources on NUMA nodes 112/114 such that the NUMA nodes 112/114 and/or server 110 do not become overcommitted.

The server 110 may include a local NUMA management system 114 that monitors the NUMA nodes 112/114 and/or virtual resources 120/128 to detect events that indicate resource contention or performance degradation. For instance, the local NUMA management system 114 may detect that two virtual resources 120 ask for CPU at the same time, or substantially the same time, and only one of the virtual resources 120 was given CPU. In such an example, it may be determined that the CPU resource is overcommitted and is causing performance degradation. As another example, the local NUMA management system 114 may determine that an average, or peak, utilization value for a particular computing resource provided by a NUMA node 112 is over a threshold value that is indicative of performance degradation. For instance, the local NUMA management system 114 may determine that a utilization rate of the local memory 118 of a NUMA node 112 is above a threshold value (e.g., 90%, 95%, etc.) that generally results in poor performance by the NUMA node 112 in supporting virtual resources 120. In another example, the NUMA node 112 may be running under-provisioned virtual resources that are ensured access to various amounts of computing resources, and the threshold value may be lower (e.g., 50%, 60%, etc.). In such examples, the local NUMA management system 114 may determine that the virtual resources 120 are contending with each other for access to computing resources, and that the NUMA node 112 is overcommitted (e.g., cannot provide an amount of computing resources that are supposed to be allocated to the virtual resources).

In such examples, local NUMA management system 114, which is generally a control-plane component, may live migrate 150 a virtual resource 120 from the overcommitted, or poorly performing, NUMA node 112 onto the NUMA node 114 with sufficient computing resources to run the virtual resource 120. In examples where the server 110 has a large number of NUMA nodes (e.g., 3 or more), the local NUMA management system 114 may rank the NUMA nodes based on the availability of computing resources (as described further in FIG. 3). For instance, the local NUMA management system 114 may obtain utilization data from the NUMA nodes 112/114 and determine, across the different types of computing resources, which of the NUMA nodes 112/114 has the most additional computing resources. The local NUMA management system 114 may then migrate one or more virtual resources 120 from the overcommitted NUMA node 112 to a NUMA node 114 with available and sufficient computing resources. The virtual resources 120 may be migrated during run time and stay available (e.g., hot migration), or when the virtual resource 120 has been powered off (e.g., cold migration). The local NUMA management system 114 may ensure that local memory 124 is pre-allocated for the virtual resources 120, and copy data from the current local memory bank 118 to the local memory bank 124 on which the virtual resources 120 are to run. In this way, one or more components on the server 110 may reduce resource contention on individual NUMA nodes and increase the performance of virtual resources 120/128.

As illustrated, the servers 110 may each support virtual resources 120/128 that may be different types of virtual resources provided by the service provider network 102. For instance, servers 110 may support one or more virtual resources 120/128 that are of different types. Rather than allocating all the computing resources of an entire server 110 or NUMA node to support a workload, the service provider network 110 may include a virtualization layer (e.g., containing one or more hypervisors) that includes instances of "virtual" computing resources (also referred to interchangeably herein as "virtual machines" or "VM instances") that represent the allocated portions of the physical computing resources of the servers 110. These virtual resources 120/128 may emulate servers 110 to operate and support workloads, and may have their own operating systems, processing capabilities, storage capacity, and network connections or interfaces.

In some instances, rather than the local NUMA management system 114 performing the monitoring and migration techniques, a migration service 142 in the service provider network 102 may instead perform these techniques. For instance, the migration server 142 may receive and monitoring utilization data for the different NUMA nodes 112/114 and/or virtual resources 1120/128, detect events associated with migrating the virtual resources 120, and cause the live migration 150 to occur.

Users may create user accounts with the service provider to utilize the resources and services of the service provider network 102. The users may utilize their user devices to communicate over one or more networks 130 (e.g., WANs, PANs, LANs, etc.) with the service provider network 102. The user devices may comprise any type of computing device configured to communicate over network(s) 130, such as mobile phones, tablets, laptop computers, desktop computers, televisions, servers, and/or any other type of computing device. The users may desire that the service provider network 102 host or support workloads on the computing-resource network 104 that is managed by the service provider. Accordingly, the users may, via their user account, request that a workload be launched on their behalf, and provide input data via one or more user portals (e.g., web console, command line interface (CLI), application programming interface (API), etc.).

As described herein, a workload may generally include a designated collection or grouping of computing resources (e.g., compute, memory, storage, networking, etc.) in the computing-resource network 104, and the code or logic that performs functionality using the computing resources. The service provider network 102 may support a wide variety of workloads, such as web servers, databases, customer-facing applications, distributed data stores, batch processing, machine/deep learning training and/or inference, online gaming, video encoding, memory caching, and/or any other type of workload that can be supported by computing resources of the computing-resource network 104.

The service provider network 102 may include a compute-management service 138 that may include or be associated with the migration service 142, and be configured to migrate the virtual resources 120/128. The compute-management service 138 may perform live migrations 150 of the virtual resources 120/128 such that the workloads running thereon do not suffer downtime. In some instances, the local NUMA management system 144 may perform the migrations based on detecting the events indicative of performance degradation.

Migration refers to moving virtual machine instances (and/or other resources) between hosts in a cloud computing network, or between hosts outside of the cloud computing network and hosts within the cloud. There are different types of migration including live migration and reboot migration. Techniques for various types of migration involve managing the critical phase—the time when the virtual machine instance is unavailable to the customer—which should be kept as short as possible.

During a reboot migration, the customer experiences an outage and an effective power cycle of their virtual machine instance. For example, a control plane service can coordinate a reboot migration workflow that involves tearing down the current domain on the original host (the "source host") and subsequently creating a new domain for the virtual machine instance on the new host (the "target host"). The instance is rebooted by being shut down on the original host and booted up again on the new host.

Live migration refers to the process of moving a running virtual machine instance between different physical machines without significantly disrupting the availability of the virtual machine instance (e.g., the down time of the virtual machine instance is not noticeable by the end user). When the control plane initiates a live migration workflow it can cause the creation of a new "inactive" domain associated with the instance on a target host, while the original domain for the instance continues to run as the "active" domain on the source host. Memory (including any in-memory state of running applications), storage, and network connectivity of the virtual machine are transferred from the original host with the active domain to the destination host with the inactive domain. For example, a local migration manager running on the source can send memory pages to the target host (also referred to as the "state" of the instance), track changes to the memory pages, and continue sending the changed pages to the target host. The instance may be briefly paused to prevent state changes while transferring a final set of memory contents to the target host. Thereafter, one or more of the control plane, the local migration manager, and the hypervisors (on the source and target hosts) can transition the inactive domain to become the active domain and demote the original active domain to become the inactive domain (sometimes referred to as a "flip"), after which the instance begins running on the target host, and the inactive domain can be discarded. Additional details relating to virtual machine instance migration are provided in U.S. application Ser. No. 16/442,325 (U.S. Pat. App. Pub. No. 2019/0310880), titled "MANAGED ORCHESTRATION OF VIRTUAL MACHINE INSTANCE MIGRATION," which is incorporated herein by reference in its entirety.

Generally, the service provider network 102 and computing-resource network 104, and components thereof, may comprise software, firmware, and/or other logic that is supported one computing device, or across more computing devices in the service provider network 102. Additionally, the service provider network 102 and computing-resource network 104 may comprise a system of other devices, such as software agents stored locally on virtual resources.

As illustrated, the service provider network 102 may include one or more processors 132, one or more communication interfaces 134, and memory 136 to store and/or help execute the various services described above. The processor(s) 132 may be hardware processors (processors) configured to execute one or more stored instructions. The processor(s) 132 may each include one or more cores and processor cache(s). Further, the one or more communication interfaces 134 may provide communications between the service provider network 102 and other devices, such as the servers 110 and/or other systems or devices in the service provider network 102 and/or remote from the service provider network 102. The communication interfaces 134 may include devices configured to couple to personal area networks (PANs), wired and wireless local area networks (LANs), wired and wireless wide area networks (WANs), and so forth. For example, the communication interfaces 134 may include devices compatible with Ethernet, Wi-Fi, and so forth. By way of example, and not limitation, memory 136 may be computer-readable media and can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 2:
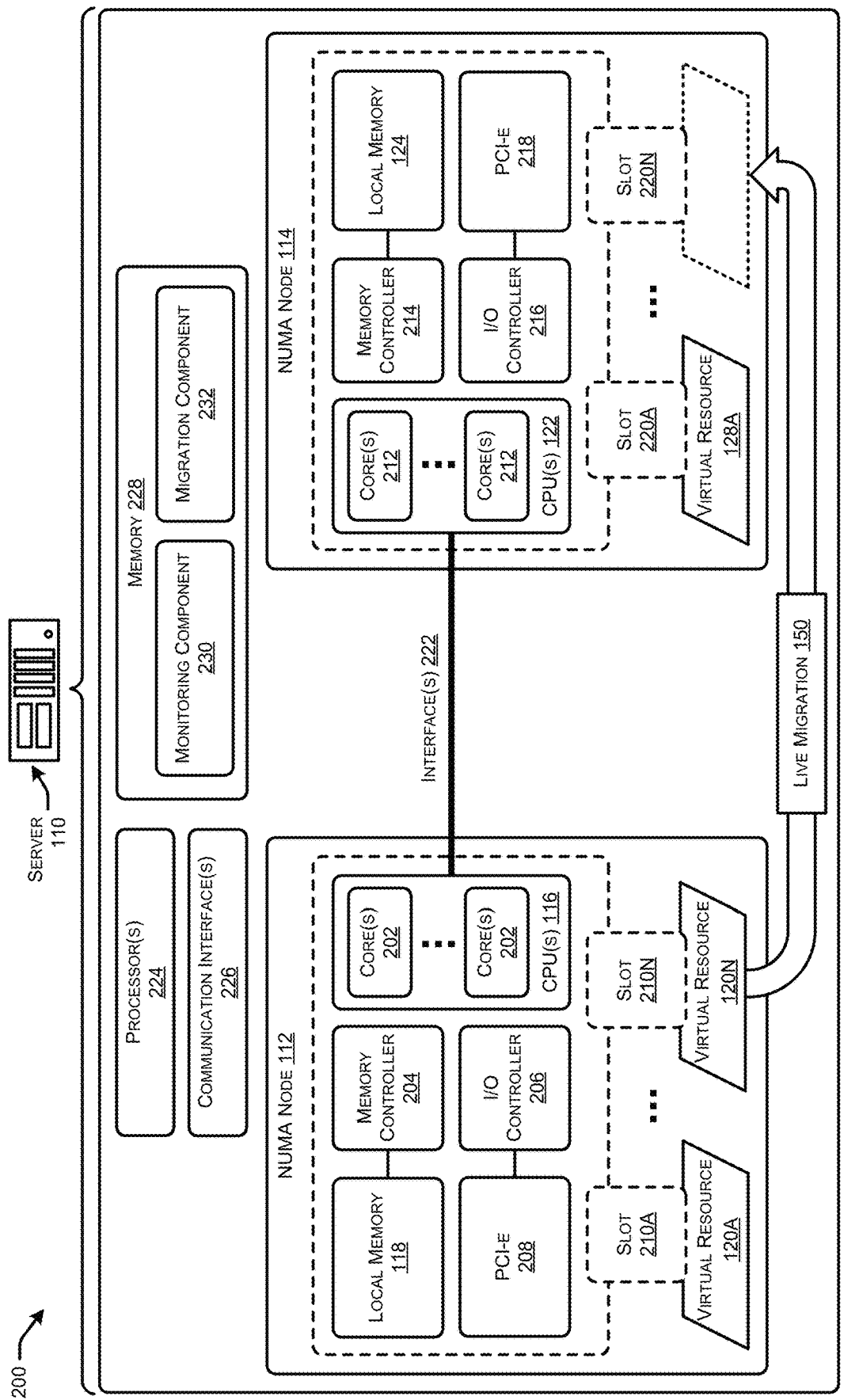
FIG. 2 illustrates a system-architecture diagram of an example server that migrates a virtual resource from running using a slot of one NUMA node to run on a slot of another NUMA node in order to reduce resource contention on a server level.

FIG. 2 illustrates a system-architecture diagram of an example server 110 that migrates a virtual resource 120 from running using a slot of one NUMA node to run on a slot of another NUMA node in order to reduce resource contention on a server level.

As illustrated, the server 110 may include multiple NUMA nodes 112/114 that each have various components. The NUMA node 112 may include one or more CPUs 116, which may include one or more cores 202. Generally, the CPU(s) 116 may be the electronic circuitry that executes instructions of a computer program. The CPU(s) 116 may perform operations specified by the programs. The cores 202 may each be an individual processor within the CPUs 116 where the cores 202 can execute different tasks such that CPUs 116 with multiple cores 202 can perform simultaneous multithreading, or hyper-threading.

Each of the NUMA nodes 112/114 may include respective local memory 118/124 that are controlled by respective memory controllers 204/214. The memory controllers 204/214 may each be digital circuits that manage the flow of data going to and from the respective local memories 118/124. The memory controllers 204/214 may be integrated memory controllers (IMCs) and be part of the microprocessor, or be separate chips.

The NUMA nodes 112/114 may additionally include respective Input/output (I/O) controllers 206/216. The I/O controllers 206/216 may receive input and output requests from the respective CPU(s) 116/122, and sends device-specific control signals to device(s) that the I/O controllers 206/216 control. For instance, the I/O controllers 206/216 may control devices associated with the Peripheral Component Interconnect Express (PCI-e) 208/218 slots. The PCI-e slots 208/218 may each be serial computer expansion busses, or points of connections, between peripheral components, such as hardware cards, graphics cards, adapters, hardware connections, etc., and the motherboard and/or CPU(s) 116/122.

As shown, each NUMA node 112/114 may have respective slots 210A-210N and 220A-220N. Generally, slots 210/220 may be pre-configured allocations of resources that are provided to virtual resources 120/128 running on the respective NUMA nodes 112/114. For instance, the slots 210/220 may each be allocated pre-configured amounts and ratios (which may be different for different slots) of CPU, memory, etc., for use by virtual resources 120/128 running thereon. Generally, each slot 210/220 supports one virtual resource 120/128. Thus, the physical resources of the NUMA nodes 112/114 may be allocated for use by virtual resources 120/128 according to the pre-configured amounts/ratios for the slots 210/220.

As shown, the server 110 may include memory 228 (which may be part of a NUMA node) that is used for running a monitoring component 230 and a migration component 232. The monitoring component 230 and the migration component 232 may be part of, or included in, the local NUMA management system 144 and be control plane components for managing the NUMA nodes 112/114.

The monitoring component 230 may collect or monitor utilization data for the NUMA nodes 112/114 and/or virtual resources 120/128 running thereon. For instance, the monitoring component 230 may obtain utilization data that represents, at a specific time and/or over a period of time, utilization or usage of the CPU(s) 116/122, local memory 118/124, long-term storage (not depicted), network I/O and bandwidth, and/or any other computing resource provided by the NUMA nodes 112/114. The monitoring component 230 may analyze the utilization data and detect one or more events that indicate that virtual resources 120/128 running on the NUMA nodes 112/114 are contending, or are likely to contend, over computing resources of the NUMA node such that performance is degraded. In one example, the monitoring component 230 may determine that utilization of at least one computing resource is above a threshold indicating that the virtual resources 120/128 are experiencing degraded performance (e.g., above 80% utilization, above 90% utilization, etc.). In some examples, the monitoring component 230 may determine that the virtual resources 120/128 are currently not experiencing degraded performance, but may experience degraded performance in the future (e.g., above 60% utilization and increasing overtime). In some instances, the monitoring component 230 may detect events such as determining that the NUMA nodes 112/114 are not evenly balanced, such as by determining that NUMA node 112 is running more virtual resources 120 than NUMA node 114.

Upon detecting one or more events, the monitoring component 230 may notify and/or otherwise work in conjunction with the migration component 232 to migrate a virtual resource 120/128. In this specific example, the monitoring component 230 may detect one or more events that indicate one or more virtual resources 120 running on the NUMA node 112 are to be migrated to the NUMA node 114. For instance, the monitoring component 230 may determine that the computing resources provided by the NUMA node 112 are overcommitted and/or may be overcommitted in the future, or may simply determine that the NUMA node 114 has less virtual resources 128 running thereon than the NUMA node 112.

In such examples, the migration component 232 may migrate one or more virtual resources 120 from the NUMA node 112 to the NUMA node 114. Generally, migrating the virtual resource(s) 120 may be a live migration 150 where the migration component 232 copies data stored in local memory 118 of the NUMA node 112 where the data represents a state of the virtual resource 120. The data that is copied may then be transferred over an interface 222 to the local memory 124 allocated to an empty slot 220 of the NUMA node 114. The NUMA node 114 may then have the CPU(s) 122 execute the virtual resource(s) 120 that were migrated from the NUMA node 112. Generally, the interface(s) 222 may be any type of processor interconnect, such as a point-to-point processor interconnect (e.g., QuickPath Interconnect), a front-side bus, etc.

In some instances, the virtual resource(s) 120 may be live migrated 150 to slots 220 that are allocated sufficient amounts, and/or the correct ratios, of computing resources to support the virtual resource 120 types. For instance, the migration component 232 may identify a slot 220 on the NUMA node 114 that has sufficient CPU, memory, etc., allocated to support the virtual resource 120 type, and pre-allocate those resources to run the virtual resource 120 according to the live migration 150 process.

As illustrated, the server 110 may include one or more hardware processors 224 (processors), or one or more devices, configured to execute one or more stored instructions. The processor(s) 224 may comprise one or more cores. The processor(s) 224 may be included in a NUMA node, or be separate from a NUMA node. Further, the server 110 may include one or more communication interfaces 226 configured to provide communications between the server 110 and other devices, such as the service provider network 102 components and/or other systems or devices in the service provider network 102 and/or remote from the service provider network 102. The communication interfaces 226 may include devices configured to couple to personal area networks (PANs), wired and wireless local area networks (LANs), wired and wireless wide area networks (WANs), and so forth. For example, the communication interfaces 226 may include devices compatible with Ethernet, Wi-Fi, and so forth.

The server 110 may also include the memory 228, such as computer-readable media, that stores various executable components (e.g., software-based components, firmware-based components, etc.). In addition to various components discussed in FIG. 1, the memory 228 may further store components to implement functionality described herein. While not illustrated, the memory 228 may store one or more operating systems utilized to control the operation of the server 110. According to one embodiment, the operating system comprises the LINUX operating system. According to another embodiment, the operating system(s) comprise the WINDOWS SERVER operating system from MICROSOFT Corporation of Redmond, Wash.. According to further embodiments, the operating system(s) can comprise the UNIX operating system or one of its variants. It should be appreciated that other operating systems can also be utilized.

By way of example, and not limitation, memory 228 may be computer-readable media and can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

Figure 3:
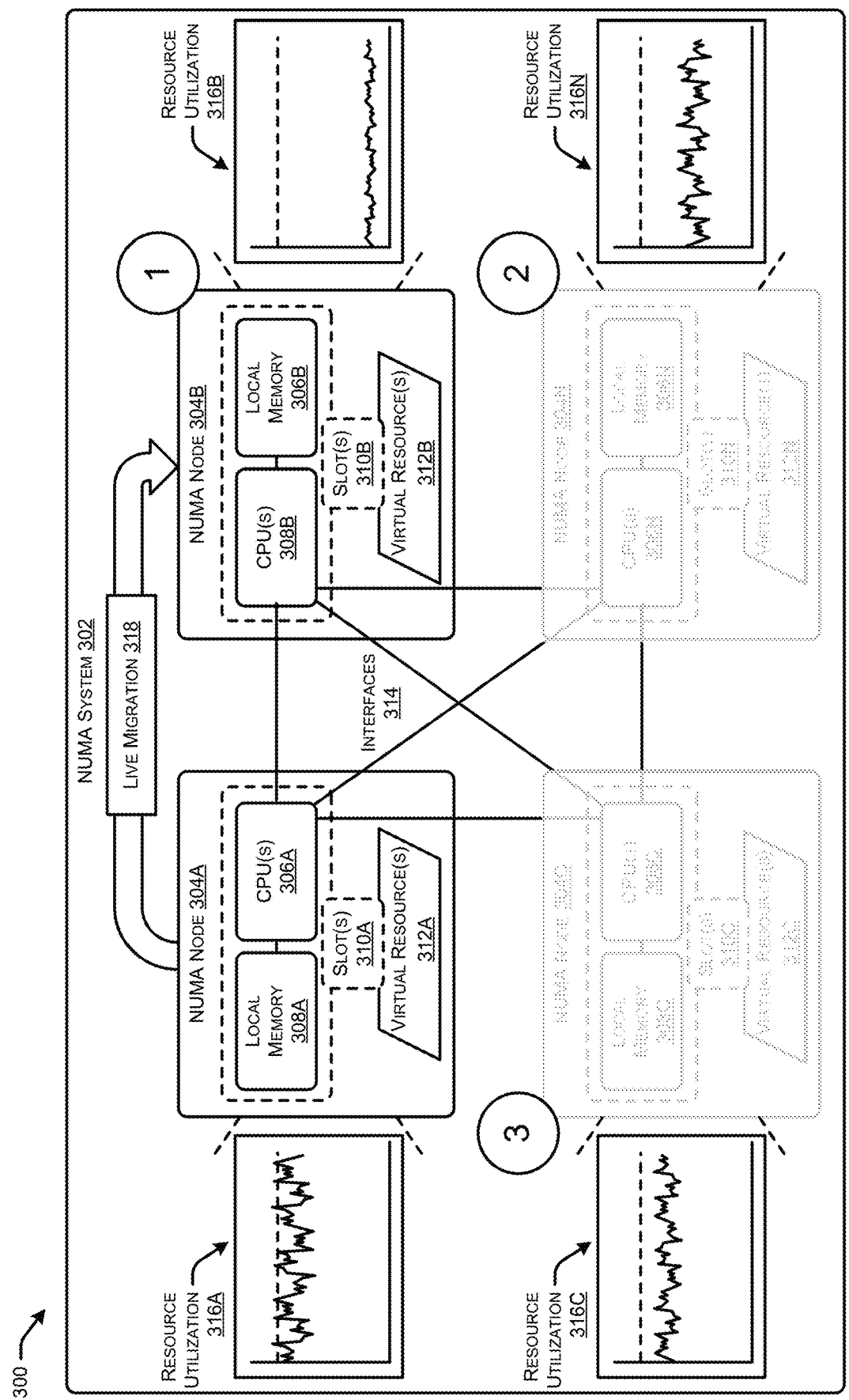
FIG. 3 illustrates a system-architecture diagram of an example server that ranks NUMA nodes based on their availability, or utilization, or computing resources, and migrates a virtual resource to the NUMA node ranked as having the most available computing resources.

FIG. 3 illustrates a system-architecture diagram of an example server 110 that ranks NUMA nodes based on their availability, or utilization, or computing resources, and migrates a virtual resource to the NUMA node ranked as having the most available computing resources.

The server 110 may include a NUMA system 302 or architecture that includes multiple NUMA nodes 304A-304N (where "N" is 4 in this case, but may be any integer). Each NUMA node 304 may include one or more CPUs 306A-306N, respective local memories 308A-308N, and having slots 310A-310N. The slots 310 may each support respective virtual resources 312A-312N, which may be VMs, containers, and/or any other virtual program or process. The NUMA nodes 304 may communicate with each other over interfaces 314, which may be any type of processor interconnect or interface over which the NUMA nodes 304 are able to communicate data.

Components of the server 110 may monitor the utilization characteristics of the NUMA nodes 304 and determine resource utilization values 316 over a period of time. The server 110 may determine that the NUMA node 304 has resource utilization values 316A that exceed a threshold value at least once, and may determine to migrate the virtual resource 312. However, resource utilization 316A exceeding a threshold is merely one example of an event that may trigger a live migration 318 of a virtual resource 2312, and any event may trigger the live migration 318 as described herein.

As shown, the NUMA nodes 304 are ranked based on their utilization 316, and the NUMA node 304B is ranked the highest as having the lowest resource utilization 316B, and thus the highest availability. Accordingly, control plane components of the server 110 may determine that a live migration 318 is to occur such that one or more virtual resources 312A are migrated from the NUMA node 304A and to the NUMA node 304B that has been determined to have the highest availability of computing resource(s). In this example, the control plane components of the server 110 may cause live migration 318 of one or more virtual resources 312 from NUME node 304A to run on slot(s) 310B of the NUMA node 304B.

Figure 4:
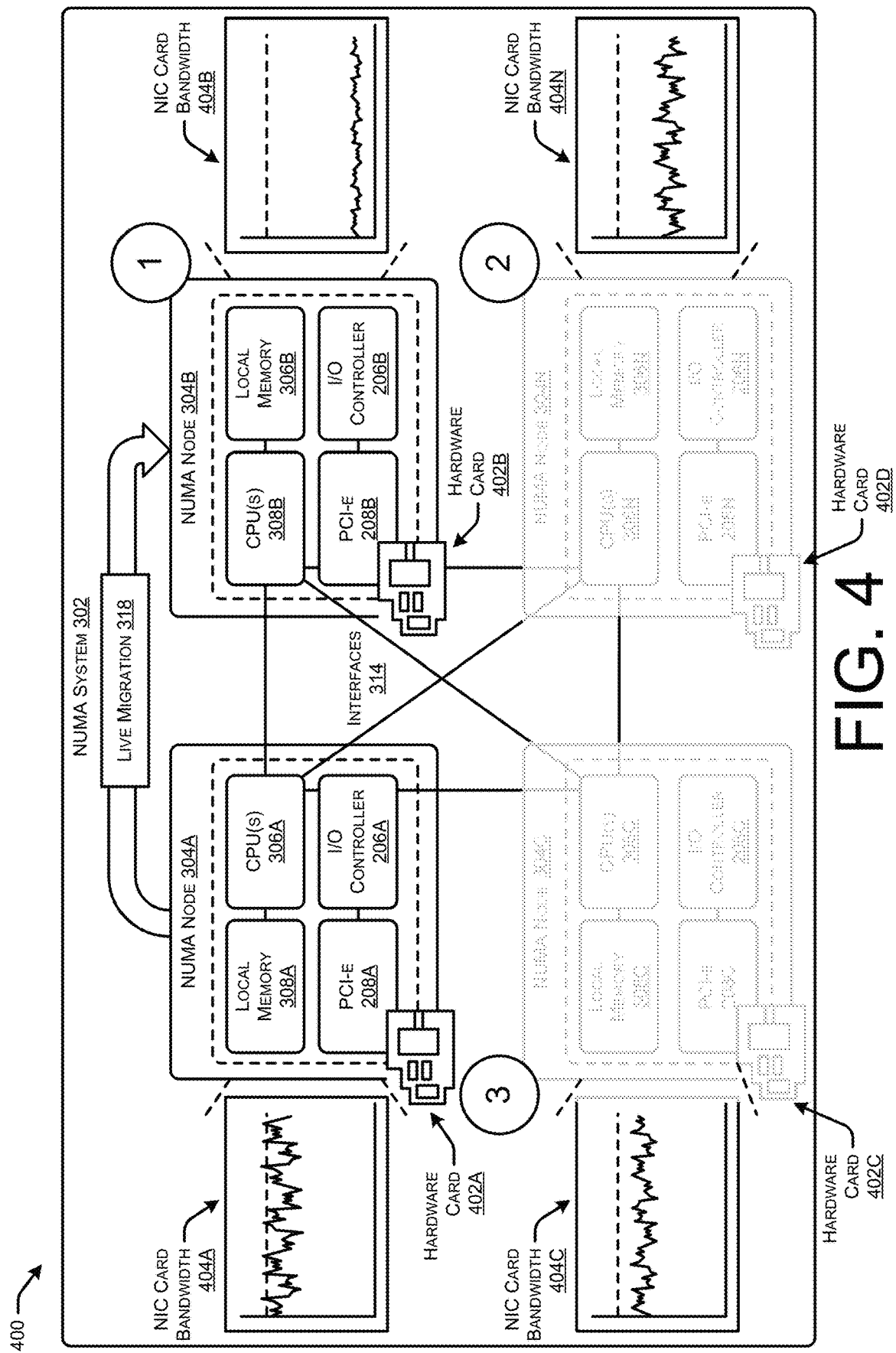
FIG. 4 illustrates a system architecture diagram of an example server that ranks NUMA nodes based on an availability, or utilization, of a computing resource provided by cards that are associated with the respective NUMA nodes, and migrates a virtual resource to the NUMA node having the card with the most availability of the computing resource.

FIG. 4 illustrates a system architecture diagram of the NUMA system 302 of an example server 110 that ranks NUMA nodes based on an availability, or utilization, of a computing resource provided by cards that are associated with the respective NUMA nodes, and migrates a virtual resource to the NUMA node having the card with the most availability of the computing resource.

In the example of FIG. 4, the NUMA nodes 304 are all associated with respective hardware cards 402, which in this example are network interface component (NIC) cards 402 that provide network I/O offloading and processing for the CPUs 306 of the NUMA nodes 304. Similar to FIG. 3, the NUMA system 302 may determine which of the hardware cards 402 has the highest bandwidth availability. As shown, the NUMA nodes 304 are ranked based on their respective hardware card's 402 bandwidth utilization values 404, and the NUMA node 304B is ranked the highest as having the lowest bandwidth utilization values 404, and thus the highest availability. However, the hardware cards 402 may be any type of card that provides computing resources and/or software components for offloading from the NUMA nodes 304. The hardware cards 402 may provide memory (e.g., RAM), CPU, long-term storage, and/or any other type of computing resource.

Figure 5:
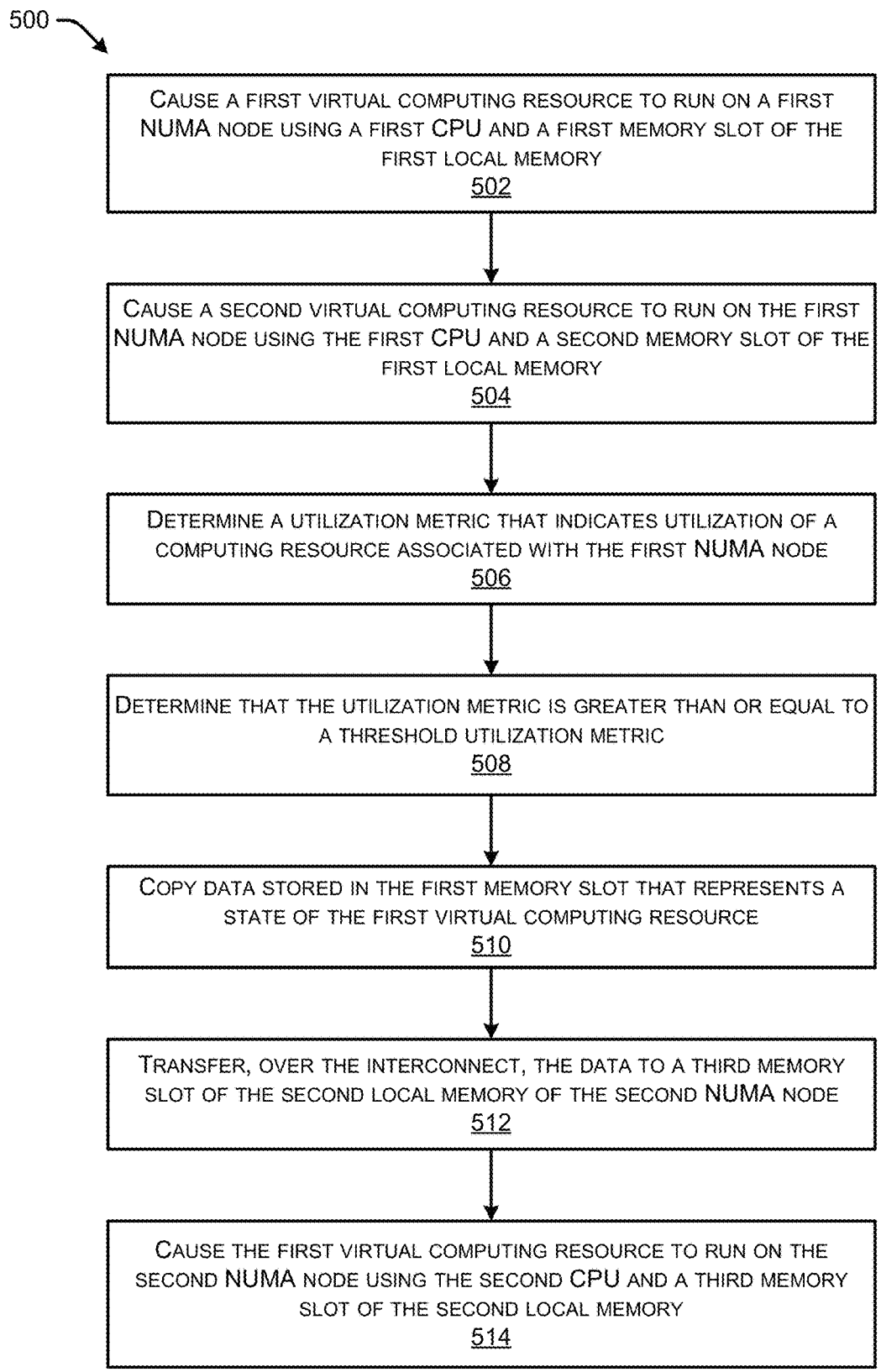
FIG. 5 illustrates a flow diagram of an example method for a server to migrate a virtual resource from running on a NUMA node that has high resource consumption to another NUMA node that has lower resource consumption.
Figure 6:
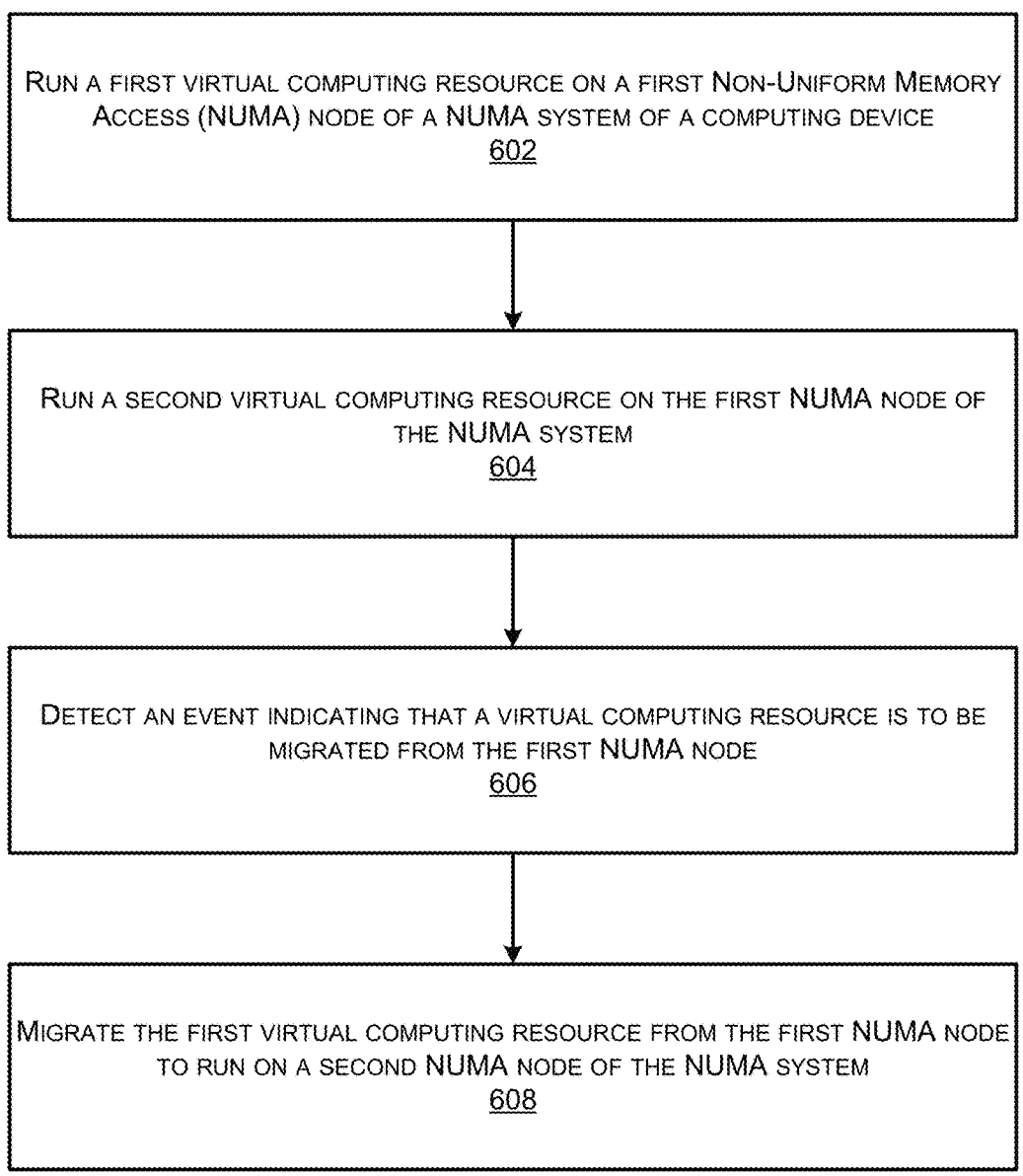
FIG. 6 illustrates a flow diagram of an example method for a server to migrate a virtual resource from running on a NUMA node that has high resource consumption to another NUMA node in response to detecting an event indicating performance degradation.

FIGS. 5 and 6 illustrate flow diagrams of example methods 500 and 600 that illustrate aspects of the functions performed at least partly by the service provider network 102 as described in this disclosure. The logical operations described herein with respect to FIGS. 5 and 6 may be implemented (1) as a sequence of computer-implemented acts or program modules running on a computing system and/or (2) as interconnected machine logic circuits or circuit modules within the computing system.

The implementation of the various components described herein is a matter of choice dependent on the performance and other requirements of the computing system. Accordingly, the logical operations described herein are referred to variously as operations, structural devices, acts, or modules. These operations, structural devices, acts, and modules can be implemented in software, in firmware, in special purpose digital logic, and any combination thereof. It should also be appreciated that more or fewer operations might be performed than shown in the FIGS. 5 and 6 and described herein. These operations can also be performed in parallel, or in a different order than those described herein. Some or all of these operations can also be performed by components other than those specifically identified. Although the techniques described in this disclosure is with reference to specific components, in other examples, the techniques may be implemented by less components, more components, different components, or any configuration of components. As described herein, a virtual computing resource may comprise one or more of a VM instance, a virtual container, a program, and/or any other virtual representation FIG. 5 illustrates a flow diagram of an example method 500 for a server to migrate a virtual resource from running on a NUMA node that has high resource consumption to another NUMA node that has lower resource consumption.

At 502, a server 110 may cause a first virtual computing resource to run on the first NUMA node using the first CPU and a first memory slot of the first local memory. For instance, a first virtual resource 120A may run on a slot 210 of a NUMA node 112 using computing resources of the NUMA node 112.

At 504, the server 110 may cause a second virtual computing resource to run on the first NUMA node using the first CPU and a second memory slot of the first local memory. For example, a virtual resource 120B may run on a slot 210B of the NUMA node 112 and share the computing resources of the NUMA node 112 with the virtual resource 120A.

At 506, the server 110 may determine a utilization metric that indicates utilization of a computing resource associated with the first NUMA node. For instance, the utilization metric may indicate utilization of one or more computing resources (CPU, memory, etc.) of the NUMA node 112 by the virtual resources 120 at appoint in time, and/or over a period of time.

At 508, the server 110 may determine that the utilization metric is greater than or equal to a threshold utilization metric where the threshold utilization metric being associated with degradation in performance of the first NUMA node running the first virtual computing resource. For instance, the threshold utilization metric may correspond to a utilization value that, if exceeded, indicates that virtual resources 120 are suffering performance degradation. As another example, the threshold utilization metric may indicate a threshold that indicates the virtual resources 120 may ultimately experience performance degradation (e.g., lack of CPU cycles, inability to move data into memory, etc.).

At 510, the server 110 may copy data stored in the first memory slot that represents a state of the first virtual computing resource. For instance, the migration component 232 may copy data from the local memory 118 of the NUMA node 112.

At 512, the server 110 may transfer, over the interconnect, the data to a third memory slot of the second local memory of the second NUMA node. For instance, the migration component 232 may transfer the copied data to a slot 220 of the NUMA node 114. At 514, the server 110 may cause the first virtual computing resource to run on the second NUMA node using the second CPU and a third memory slot of the second local memory.

FIG. 6 illustrates a flow diagram of an example method 600 for a server to migrate a virtual resource from running on a NUMA node that has high resource consumption to another NUMA node in response to detecting an event indicating performance degradation.

At 602, a server 110 may run a first virtual computing resource on a first Non-Uniform Memory Access (NUMA) node of a NUMA system of a computing device. At 604, the server 110 may run a second virtual computing resource on the first NUMA node of the NUMA system. For instance, virtual resources 120A may run via a slot 210A of the NUMA node 112 and a virtual resource 120B may run via a slot 210B of the NUMA node 112.

At 606, the server 110 may detect an event indicating that a virtual computing resource is to be migrated from the first NUMA node. For instance, the server 110 may determine that the NUMA node 112 is running more virtual resources 120 than other NUMA nodes in the server 110, detect utilization of one or more computing resources of the NUMA node 112 exceeding a threshold metric indicating lack of the computing resource(s), determining that two virtual resources 120 requested access to CPU cycles and only one of the resources 120 getting access, etc. The event may be proactive to prevent degradation of performance of the virtual resources, and/or reactive once degradation of performance of a virtual resource 120 has begun.

At 608, the server 110 may migrate the first virtual computing resource from the first NUMA node to run on a second NUMA node of the NUMA system. For instance, the migration component 232 may perform a live migration 150 of at least one virtual resource 120 to run on a slot 220 of the NUMA node 114.

Figure 7:
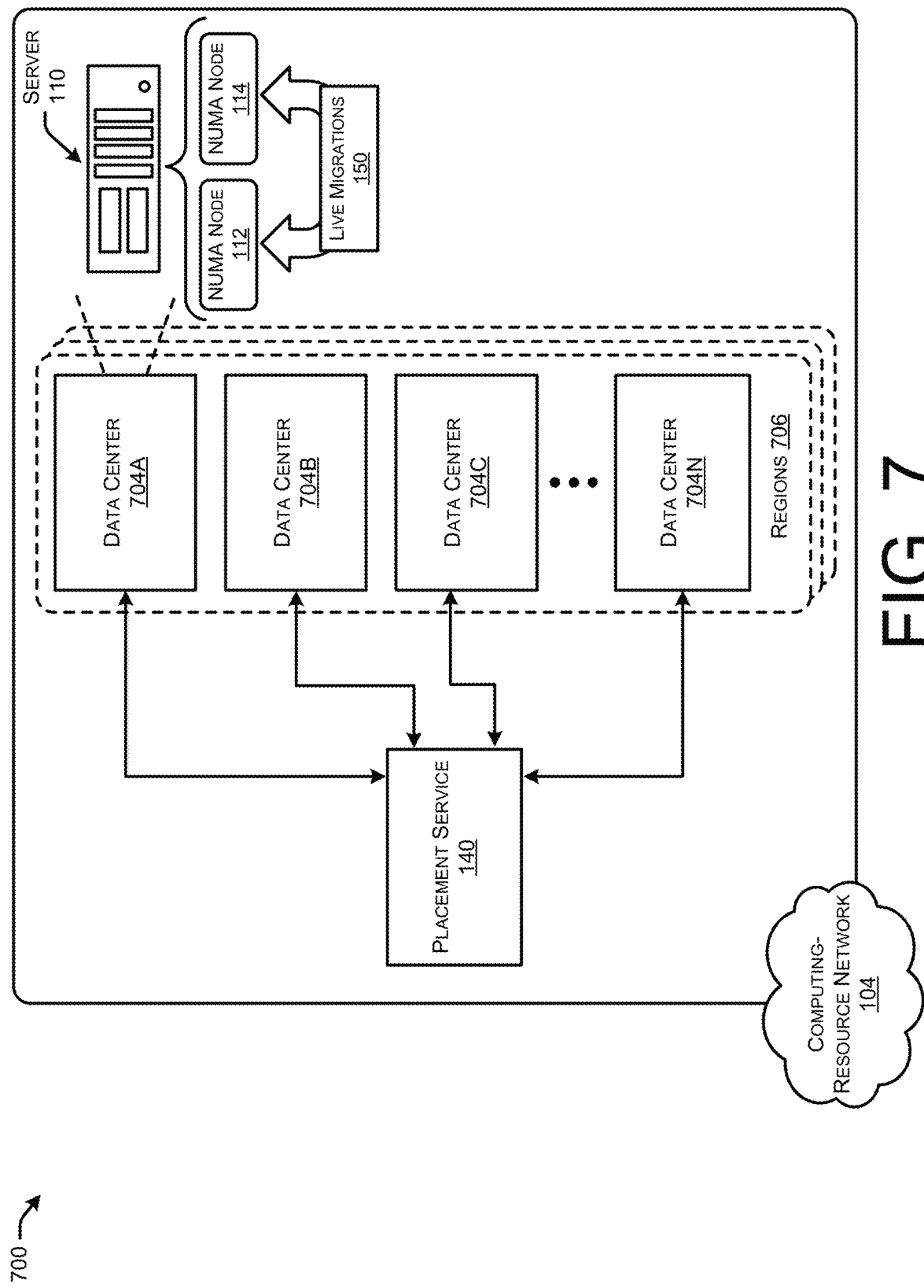
FIG. 7 is a system and network diagram that shows an illustrative operating environment that includes data centers of a service provider network that can be configured to implement aspects of the functionality described herein.

FIG. 7 is a system and network diagram 7000 that shows an illustrative operating environment that includes data centers 704 in one or more regions 706 of a service provider network 102 that can be configured to implement aspects of the functionality described herein. The service provider network 102 can provide computing resources, like VM instances and storage, on a permanent or an as-needed basis. Among other types of functionality, the computing resources provided by the service provider network 102 may be utilized to implement the various services described above. As also discussed above, the computing resources provided by the service provider network 102 can include various types of computing resources, such as data processing resources like VM instances, data storage resources, networking resources, data communication resources, network services, and the like.

Each type of computing resource provided by the service provider network 102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, some or all of the network services described above, and/or other types of programs. Data storage resources can include file storage devices, block storage devices, and the like. The service provider network 102 can also be configured to provide other types of computing resources not mentioned specifically herein.

The computing resources provided by the service provider network 102 may be enabled in one embodiment by one or more data centers 704A-704N (which might be referred to herein singularly as "a data center 704" or in the plural as "the data centers 704"). The data centers 704 are facilities utilized to house and operate computer systems and associated components. The data centers 704 typically include redundant and backup power, communications, cooling, and security systems. The data centers 704 can also be located in geographically disparate locations, or regions 706. One illustrative embodiment for a data center 704 that can be utilized to implement the technologies disclosed herein will be described below with regard to FIG. 8.

The data centers 704 may be accessible over any wired and/or wireless network(s) 130, which can be a wide area communication network ("WAN"), such as the Internet, an intranet or an Internet service provider ("ISP") network or a combination of such networks. For example, and without limitation, a user of the service provider network 102 may access the service provider network 102 by way of the network(s) 130. It should be appreciated that a local-area network ("LAN"), the Internet, or any other networking topology known in the art that connects the data centers 704 to remote clients and other users can be utilized. It should also be appreciated that combinations of such networks can also be utilized.

As shown, the data centers 704 may be the same as or similar to data centers 106 and include one or more servers 110. At least one of the servers 110 may be configured to perform live migrations 150 between multiple NUMA nodes 112/114.

Figure 8:
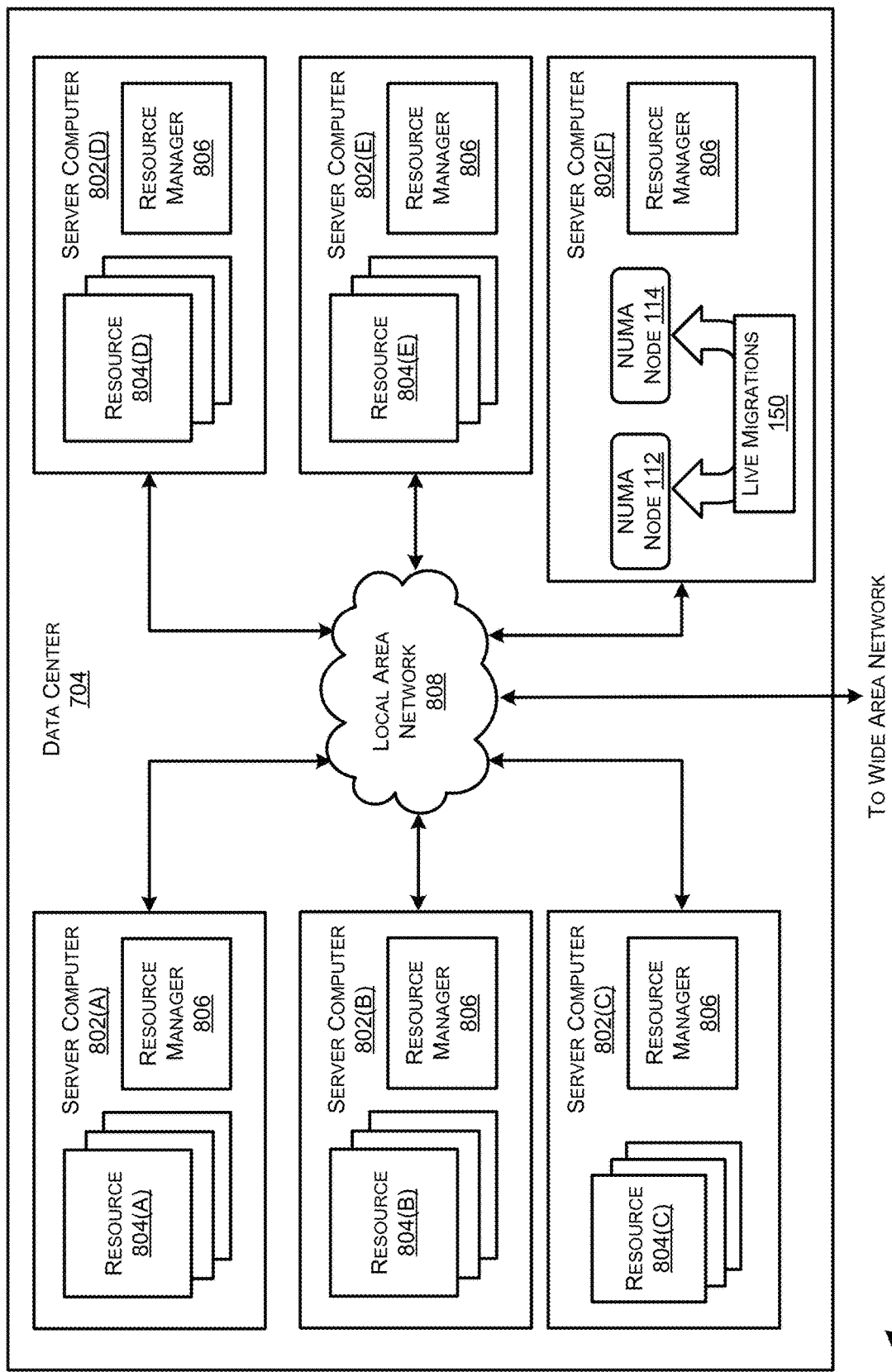
FIG. 8 is a computing system diagram illustrating a configuration for a data center that can be utilized to implement aspects of the technologies disclosed herein.

FIG. 8 is a computing system diagram 800 that illustrates one configuration for a data center 704 that implements aspects of the technologies disclosed herein. The example data center 704 shown in FIG. 8 includes several server computers 802A-802F (which might be referred to herein singularly as "a server computer 802" or in the plural as "the server computers 802") for providing computing resources 804A-804E. In some examples, the resources 804 and/or server computers 802 may include, be included in, or correspond to, the servers 110 described herein.

The server computers 802 can be standard tower, rack-mount, or blade server computers configured appropriately for providing the computing resources described herein (illustrated in FIG. 8 as the computing resources 804A-804E). As mentioned above, the computing resources provided by the service provider network 102 can be data processing resources such as VM instances or hardware computing systems, database clusters, computing clusters, storage clusters, data storage resources, database resources, networking resources, and others. Some of the servers 802 can also be configured to execute a resource manager 806 capable of instantiating and/or managing the computing resources. In the case of VM instances, for example, the resource manager 806 can be a hypervisor or another type of program configured to enable the execution of multiple VM instances on a single server computer 802. Server computers 802 in the data center 1004 can also be configured to provide network services and other types of services.

In the example data center 704 shown in FIG. 8, an appropriate LAN 808 is also utilized to interconnect the server computers 802A-802F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 704A-704N, between each of the server computers 802A-802F in each data center 704, and, potentially, between computing resources in each of the server computers 802. It should be appreciated that the configuration of the data center 704 described with reference to FIG. 8 is merely illustrative and that other implementations can be utilized.

The data center 704 shown in FIG. 8 also includes a server computer 802F that can execute some or all of the software components described above. For example, and without limitation, the server computer 802F (and the other server computers 802) can generally be included in to the server 110 of FIG. 1 and be configured to execute components, including the components of the local NUMA management system 144, the computing-resource network 104, the service provider network 102, and/or the other software components described above. The server computer 802F can also be configured to execute other components and/or to store data for providing some or all of the functionality described herein. In this regard, it should be appreciated that the services illustrated in FIG. 8 as executing on the server computer 802F can execute on many other physical or virtual servers in the data centers 804 in various embodiments.

As shown, the data center 704 may be the same as or similar to a data center 106 and include a server 802(F) that is the same as or similar to the server 110. The server 802(F) may be configured to perform live migrations 150 between multiple NUMA nodes 112/114.

Figure 9:
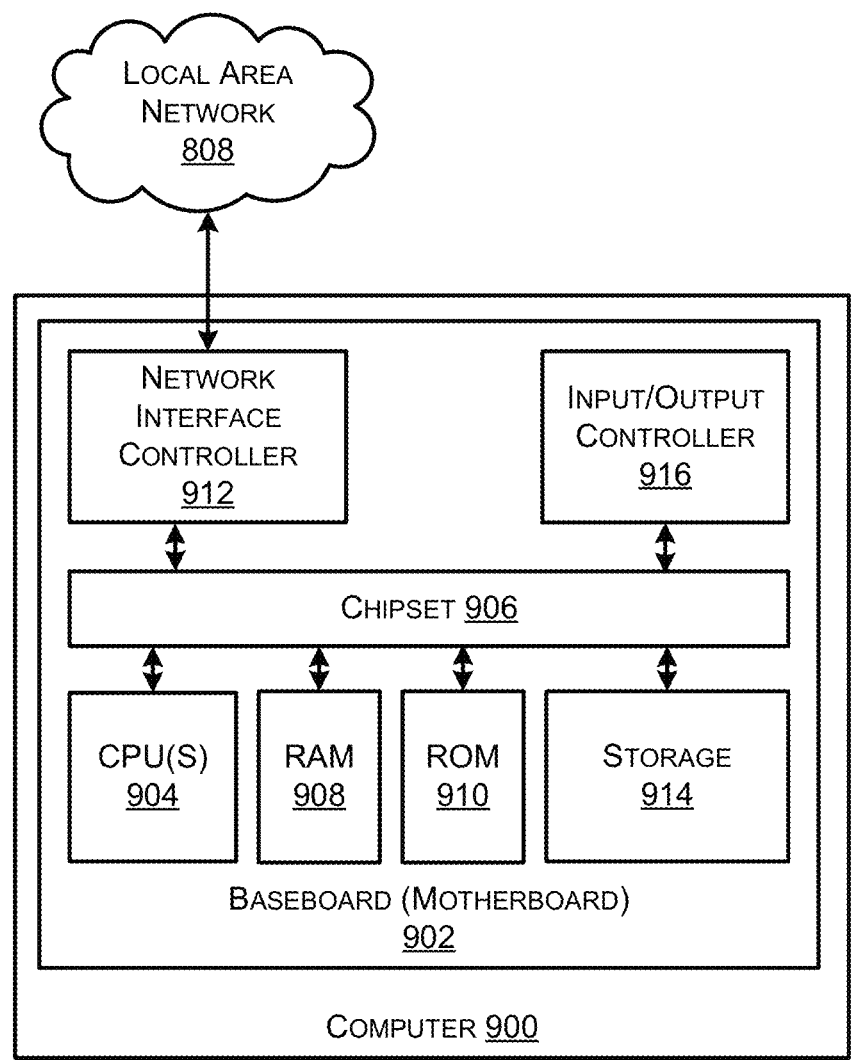
FIG. 9 is a computer architecture diagram showing an illustrative computer hardware architecture for implementing a computing device that can be utilized to implement aspects of the various technologies presented herein.

FIG. 9 shows an example computer architecture for a computer 900 capable of executing program components for implementing the functionality described above. The computer architecture shown in FIG. 9 illustrates a conventional server computer, workstation, desktop computer, laptop, tablet, network appliance, e-reader, smartphone, or other computing device, and can be utilized to execute any of the software components presented herein. In some examples, the server computer 900 may correspond to, or be the same as or similar to, a server 110 described in FIG. 1.

The computer 900 includes a baseboard 902, or "motherboard," which is a printed circuit board to which a multitude of components or devices can be connected by way of a system bus or other electrical communication paths. In one illustrative configuration, one or more central processing units ("CPUs") 904 operate in conjunction with a chipset 906. The CPUs 904 can be standard programmable processors that perform arithmetic and logical operations necessary for the operation of the computer 900.

The CPUs 904 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 906 provides an interface between the CPUs 904 and the remainder of the components and devices on the baseboard 902. The chipset 906 can provide an interface to a RAM 908, used as the main memory in the computer 900. The chipset 906 can further provide an interface to a computer-readable storage medium such as a read-only memory ("ROM") 910 or non-volatile RAM ("NVRAM") for storing basic routines that help to startup the computer 900 and to transfer information between the various components and devices. The ROM 910 or NVRAM can also store other software components necessary for the operation of the computer 900 in accordance with the configurations described herein.

The computer 900 can operate in a networked environment using logical connections to remote computing devices and computer systems through a network, such as the network 808. The chipset 906 can include functionality for providing network connectivity through a network interface controller (NIC) 912, such as a gigabit Ethernet adapter. The NIC 912 is capable of connecting the computer 900 to other computing devices over the network 808 (or 88). It should be appreciated that multiple NICs 912 can be present in the computer 900, connecting the computer to other types of networks and remote computer systems.

The computer 900 can include storage 914 (e.g., disk) that provides non-volatile storage for the computer. The storage 914 can consist of one or more physical storage units. The storage 914 can store information by altering the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 900 can further read information from the storage 914 by detecting the physical states or characteristics of one or more particular locations within the physical storage units.

In addition to the storage 914 described above, the computer 900 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 900. In some examples, the operations performed by the service provider network 102, and or any components included therein, may be supported by one or more devices similar to computer 900. Stated otherwise, some or all of the operations performed by the service provider network 102, and or any components included therein, may be performed by one or more computer devices 900 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

The storage 914 can store an operating system utilized to control the operation of the computer 900. According to one embodiment, the operating system comprises the LINUX operating system. According to another embodiment, the operating system comprises the WINDOWS SERVER operating system from MICROSOFT Corporation of Redmond, Washington. According to further embodiments, the operating system can comprise the UNIX operating system or one of its variants. It should be appreciated that other operating systems can also be utilized. The storage 914 can store other system or application programs and data utilized by the computer 900.

In one embodiment, the storage 914, RAM 908, ROM 910, and/or other computer-readable storage media may be encoded with computer-executable instructions which, when loaded into the computer 900, transform the computer from a general-purpose computing system into a special-purpose computer capable of implementing the embodiments described herein. These computer-executable instructions transform the computer 900 by specifying how the CPUs 904 transition between states, as described above. According to one embodiment, the computer 900 has access to computer-readable storage media storing computer-executable instructions which, when executed by the computer 900, perform the various techniques described above. The computer 900 can also include computer-readable storage media having instructions stored thereupon for performing any of the other computer-implemented operations described herein.

Generally, the computer 900 may be an example of a server 110 (and other computing devices, servers, etc.) described herein. The CPU(s) 904, RAM 908, ROM 910, storage 914, bandwidth of the NIC 912, and/or other resources of the computer 900 may be allocated to one or more different VM instances as described herein based on different VM instance types.

The computer 900 can also include one or more input/output controllers 916 for receiving and processing input from a number of input devices, such as a keyboard, a mouse, a touchpad, a touch screen, an electronic stylus, or other type of input device. Similarly, an input/output controller 916 can provide output to a display, such as a computer monitor, a flat-panel display, a digital projector, a printer, or other type of output device. It will be appreciated that the computer 900 might not include all of the components shown in FIG. 9, can include other components that are not explicitly shown in FIG. 9, or might utilize an architecture completely different than that shown in FIG. 9.

In some examples, the service provider network 102 may be or comprise a cloud provider network. A cloud provider network (sometimes referred to simply as a "cloud") refers to a pool of network-accessible computing resources (such as compute, storage, and networking resources, applications, and services), which may be virtualized or bare-metal. The cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

A cloud provider network can be formed as a number of regions, where a region is a separate geographical area in which the cloud provider clusters data centers. Each region can include two or more availability zones connected to one another via a private high-speed network, for example a fiber communication connection. An availability zone (also known as an availability domain, or simply a "zone") refers to an isolated failure domain including one or more data center facilities with separate power, separate networking, and separate cooling from those in another availability zone. A data center refers to a physical building or enclosure that houses and provides power and cooling to servers of the cloud provider network. Preferably, availability zones within a region are positioned far enough away from one other that the same natural disaster should not take more than one availability zone offline at the same time. Customers can connect to availability zones of the cloud provider network via a publicly accessible network (e.g., the Internet, a cellular communication network) by way of a transit center (TC). TCs can be considered as the primary backbone locations linking customers to the cloud provider network, and may be collocated at other network provider facilities (e.g., Internet service providers, telecommunications providers) and securely connected (e.g. via a VPN or direct connection) to the availability zones. Each region can operate two or more TCs for redundancy. Regions are connected to a global network which includes private networking infrastructure (e.g., fiber connections controlled by the cloud provider) connecting each region to at least one other region.

The cloud provider network may deliver content from points of presence outside of, but networked with, these regions by way of edge locations and regional edge cache servers. This compartmentalization and geographic distribution of computing hardware enables the cloud provider network to provide low-latency resource access to customers on a global scale with a high degree of fault tolerance and stability.

With cloud computing, instead of buying, owning, and maintaining their own data centers and servers, organizations can acquire technology such as compute power, storage, databases, and other services on an as-needed basis. The cloud provider network can provide on-demand, scalable computing services to users through a network, for example allowing users to have at their disposal scalable "virtual computing devices" via their use of the compute servers and block store servers. These virtual computing devices have attributes of a personal computing device including hardware (various types of processors, local memory, random access memory ("RAM"), hard-disk and/or solid state drive ("SSD") storage), a choice of operating systems, networking capabilities, and pre-loaded application software. Each virtual computing device may also virtualize its console input and output ("I/O") (e.g., keyboard, display, and mouse). This virtualization allows users to connect to their virtual computing device using a computer application such as a browser, application programming interface, software development kit, or the like, in order to configure and use their virtual computing device just as they would a personal computing device. Unlike personal computing devices, which possess a fixed quantity of hardware resources available to the user, the hardware associated with the virtual computing devices can be scaled up or down depending upon the resources the user requires. Users can choose to deploy their virtual computing systems to provide network-based services for their own use and/or for use by their customers or client.

The cloud provider network may implement various computing resources or services, which may include a virtual compute service, data processing service(s) (e.g., map reduce, data flow, and/or other large scale data processing techniques), data storage services (e.g., object storage services, block-based storage services, or data warehouse storage services) and/or any other type of network based services (which may include various other types of storage, processing, analysis, communication, event handling, visualization, and security services not illustrated). The resources required to support the operations of such services (e.g., compute and storage resources) may be provisioned in an account associated with the cloud provider, in contrast to resources requested by users of the cloud provider network, which may be provisioned in user accounts.

While the foregoing invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A server device having a Non-Uniform Memory Access (NUMA) memory architecture, the server device comprising:
    a first NUMA node including a first computer-processor unit (CPU), first local memory, and a first memory controller that is connected to the first local memory;
    a second NUMA node including a second CPU, second local memory, and a second memory controller connected to the second local memory;
    an interconnect that provides the first NUMA node with remote access to the second local memory of the second NUMA node; and
    one or more computer-readable media storing computer-executable instructions that, when executed by one or more processors, cause the one or more processors to perform operations comprising:
        causing a first virtual computing resource to run on the first NUMA node using the first CPU and a first memory slot of the first local memory;
        causing a second virtual computing resource to run on the first NUMA node using the first CPU and a second memory slot of the first local memory;
        determining a utilization metric that indicates utilization of a computing resource associated with the first NUMA node;
        determining that the utilization metric is greater than or equal to a threshold utilization metric, the threshold utilization metric being associated with degradation in performance of the first NUMA node running the first virtual computing resource;
        in response to determining that the utilization metric is greater than or equal to a threshold utilization metric:
            copying data stored in the first memory slot that represents a state of the first virtual computing resource;
            transferring, over the interconnect, the data to a third memory slot of the second local memory of the second NUMA node; and
            causing the first virtual computing resource to run on the second NUMA node using the second CPU and a third memory slot of the second local memory.

2. The server device of claim 1, the utilization metric being a first utilization metric, further comprising a third NUMA node including a third CPU, third local memory, and a third memory controller connected to the third local memory, the operations further comprising:
    determining a second utilization metric that indicates a utilization of the computing resource associated with the second NUMA node;
    determining a third utilization metric that indicates a utilization of the computing resource associated with the third NUMA node; and
    selecting the second NUMA node to run the first virtual computing resources based at least in part on the second utilization metric and the third utilization metric.

3. The server device of claim 1, further comprising:
    a first hardware card associated with the first NUMA node, the first hardware card providing the computing resource on behalf of the first NUMA node; and
    a second hardware card associated with the second NUMA node, the second hardware card providing the computing resource for the second NUMA node, the operations further comprising determining that the second hardware card has an availability of the computing resource sufficient to run the first virtual computing resource.

4. A computer-implemented method comprising:
running a first virtual computing resource on a first Non-Uniform Memory Access (NUMA) node of a NUMA system of a computing device;
running a second virtual computing resource on the first NUMA node of the NUMA system;
detecting an event indicating that a virtual computing resource is to be migrated from the first NUMA node; and
based at least in part on detecting the event, migrating the first virtual computing resource from the first NUMA node to run on a second NUMA node of the NUMA system, wherein migrating the first virtual computing resource includes:
copying data that represents a state of the first virtual computing resource;
transferring, over an interconnect of the NUMA system, the data to the second NUMA node; and
causing the first virtual computing resource to run on the second NUMA node.

5. The computer-implemented method of claim 4, further comprising:
determining a utilization metric that indicates utilization of the computing resource associated with the first NUMA node,
wherein detecting the event includes determining that the utilization metric is greater than or equal to a threshold utilization metric, the threshold utilization metric being associated with degradation in performance of the first NUMA node running the first virtual computing resource.

6. The computer-implemented method of claim 4, wherein:
the first NUMA node includes a central-processing unit (CPU); and
detecting the event includes determining that the first virtual computing resource and the second virtual computing resource each attempted to utilize the CPU for processing at substantially a same time.

7. The computer-implemented method of claim 4, wherein the computing device includes:
a first hardware card associated with the first NUMA node, the first hardware card providing the computing resource on behalf of the first NUMA node; and
a second hardware card associated with the second NUMA node, the second hardware card providing the computing resource for the second NUMA node,
the method further comprising determining that the second hardware card has an availability of the computing resource sufficient to run the first virtual computing resource.

8. The computer-implemented method of claim 4, further comprising:
determining a first utilization metric that indicates utilization of the computing resource associated with the second NUMA node;
determining a second utilization metric that indicates utilization of the computing resource associated with a third NUMA node of the NUMA system; and
selecting the second NUMA node to run the first virtual computing resources based at least in part on the first utilization metric and the second utilization metric.

9. The computer-implemented method of claim 4, wherein the first virtual computing resource is allocated use of a first slot of the first NUMA node, the first slot allocated at least one of an amount of local memory of the first NUMA node, further comprising:
identifying a slot type of the first slot;
identifying a second slot on the second NUMA node that is of the slot type; and
running the first virtual computing resource using the second slot of the second NUMA node.

10. The computer-implemented method of claim 4, wherein the computing resource comprises at least one of a CPU resource, a memory resource, a storage resource, or a network availability resource, further comprising determining that the second NUMA node has a sufficient amount of the computing resource to support the first virtual computing resource.

11. The method of claim 4, further comprising transferring one or more network connections established with the first virtual computing resource from the first NUMA node to the second NUMA node.

12. The method of claim 4, further comprising:
transferring the first virtual computing resource from a first active domain on the first NUMA node to a first inactive domain on the second NUMA node;
transitioning the first inactive domain on the second NUMA node to a second active domain; and
transitioning the first active domain on the first NUMA node to a second inactive domain.

13. A system comprising:
a first Non-Uniform Memory Access (NUMA) node including a first computer-processor unit (CPU) and first local memory;
a second NUMA node including a second CPU and second local memory; and
one or more computer-readable media storing computer-executable instructions that, when executed by one or more processors, cause the one or more processors to perform operations comprising:
causing a first virtual computing resource to run on the first NUMA;
causing a second virtual computing resource to run on the second NUMA;
detecting an event indicating that a virtual computing resource is to be migrated from the first NUMA;
based at least in part on detecting the event:
pausing the first virtual computing resource to prevent state changes during migration;
migrating the first virtual computing resource to run on the second NUMA node; and
causing the first virtual computing resource to resume running on the second NUMA node.

14. The system of claim 13, the operations further comprising:
determining a utilization metric that indicates utilization of the computing resource associated with the first NUMA node,
wherein detecting the event includes determining that the utilization metric is greater than or equal to a threshold utilization metric, the threshold utilization metric being associated with degradation in performance of the first NUMA node running the first virtual computing resource.

15. The system of claim 13, wherein detecting the event includes determining that the first virtual computing resource and the second virtual computing resource each attempted to utilize the first CPU for processing at substantially a same time.

16. The system of claim 13, further comprising:
   a first hardware card associated with the first NUMA node, the first hardware card providing the computing resource on behalf of the first NUMA node; and
   a second hardware card associated with the second NUMA node, the second hardware card providing the computing resource for the second NUMA node,
   the operations further comprising determining that the second hardware card has an availability of the computing resource sufficient to run the first virtual computing resource.

17. The system of claim 13, the operations further comprising:
   determining a first utilization metric that indicates utilization of the computing resource associated with the second NUMA node;
   determining a second utilization metric that indicates utilization of the computing resource associated with a third NUMA node of the NUMA system; and
   selecting the second NUMA node to run the first virtual computing resources based at least in part on the first utilization metric and the second utilization metric.

18. The system of claim 13, wherein:
   the first virtual computing resource uses a first memory slot of first local memory; and
   migrating the first virtual computing resource includes:
      copying data stored in the first memory slot that represents a state of the first virtual computing resource;
      transferring, over an interconnect, the data to a second memory slot of second local memory of the second NUMA node; and
      causing the first virtual computing resource to run on the second NUMA node using the second CPU and the second memory slot of the second local memory.

19. The system of claim 13, wherein the first virtual computing resource is allocated use of a first slot of the first NUMA node, the first slot allocated at least one of an amount of local memory of the first NUMA node, the operations further comprising:
   identifying a slot type of the first slot;
   identifying a second slot on the second NUMA node that is of the slot type; and
   causing the first virtual computing resource to run using the second slot of the second NUMA node.

20. The system of claim 13, wherein the computing resource comprises at least one of a CPU resource, a memory resource, a storage resource, or a network availability resource, the operations further comprising determining that the second NUMA node has a sufficient amount of the computing resource to support the first virtual computing resource.

* * * * *